(12) United States Patent
Jones et al.

(10) Patent No.: US 9,647,889 B1
(45) Date of Patent: May 9, 2017

(54) STANDBY INSTANCES FOR AUTO-SCALING GROUPS

(71) Applicant: Amazon Technologies, Inc., Seattle, WA (US)

(72) Inventors: Shawn Jones, Vancouver (CA); Eric Samuel Stone, Seattle, WA (US); Derek Solomon Pai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 14/539,871

(22) Filed: Nov. 12, 2014

(51) Int. Cl.
*H04L 12/26* (2006.01)
*H04L 12/24* (2006.01)
*G06F 9/54* (2006.01)

(52) U.S. Cl.
CPC .......... *H04L 41/0823* (2013.01); *G06F 9/547* (2013.01); *H04L 41/082* (2013.01)

(58) Field of Classification Search
CPC .. G06F 9/5055; G06F 9/5077; G06F 9/45533; G06F 9/45558; H04L 41/5054; H04L 67/1008; H04L 67/42; H04L 67/16; H04L 67/101
See application file for complete search history.

(56) References Cited

U.S. PATENT DOCUMENTS

| | | | |
|---|---|---|---|
| 2010/0082897 A1* | 4/2010 | Amano | G06F 3/0613 711/112 |
| 2013/0054776 A1 | 2/2013 | Kunze | |
| 2013/0297802 A1 | 11/2013 | Laribi | |
| 2014/0058871 A1 | 2/2014 | Marr | |
| 2014/0344439 A1 | 11/2014 | Kempf | |
| 2014/0379901 A1 | 12/2014 | Tseitlin | |
| 2015/0135185 A1 | 5/2015 | Sirota | |
| 2015/0178137 A1* | 6/2015 | Gordon | H04L 67/1008 709/226 |
| 2016/0119207 A1 | 4/2016 | Tseitlin | |

* cited by examiner

*Primary Examiner* — Kim T Nguyen
(74) *Attorney, Agent, or Firm* — Davis Wright Tremaine LLP

(57) ABSTRACT

A computing resource service provider may provide computing instances organized into logical groups, such as auto-scaling groups. Computing instances assigned to an auto-scaling group may be place into standby. Standby instances may still be managed by the auto-scaling group but may not contribute to the capacity of the auto-scaling group for auto-scaling purposes.

20 Claims, 10 Drawing Sheets

STANDBY INSTANCES FOR AUTO-SCALING GROUPS

CROSS REFERENCE TO RELATED APPLICATION

This application incorporates by reference for all purposes the full disclosure of co-pending U.S. patent application Ser. No. 14/539,918, filed concurrently herewith, entitled "DETACHING INSTANCES FROM AUTO-SCALING GROUP."

BACKGROUND

The use of network computing and storage has proliferated in recent years. The resources for network computing and storage are often provided by computing resource providers who leverage large-scale networks of computers, servers and storage drives to enable clients, including content providers, customers and the like, to host and execute a variety of applications and web services. The usage of network computing allows content providers and customers, among others, to efficiently and adaptively satisfy their computing needs. However, with the growing use of virtual resources, customers are encountering situations in which the virtual resources cannot accommodate their needs during certain situations, such as unanticipated traffic spikes or need for immediate responses to satisfy increased loads. In response to this, web resource service providers are introducing automated scaling. In many cases, customers transmit requests to create instances such as, for example, virtual machine instances to execute on hardware devices. The instance can be automatically scaled enabling the service provider to accommodate customer needs during the situations described above.

BRIEF DESCRIPTION OF THE DRAWINGS

Various embodiments in accordance with the present disclosure will be described with reference to the drawings, in which.

DETAILED DESCRIPTION

Figure 1:
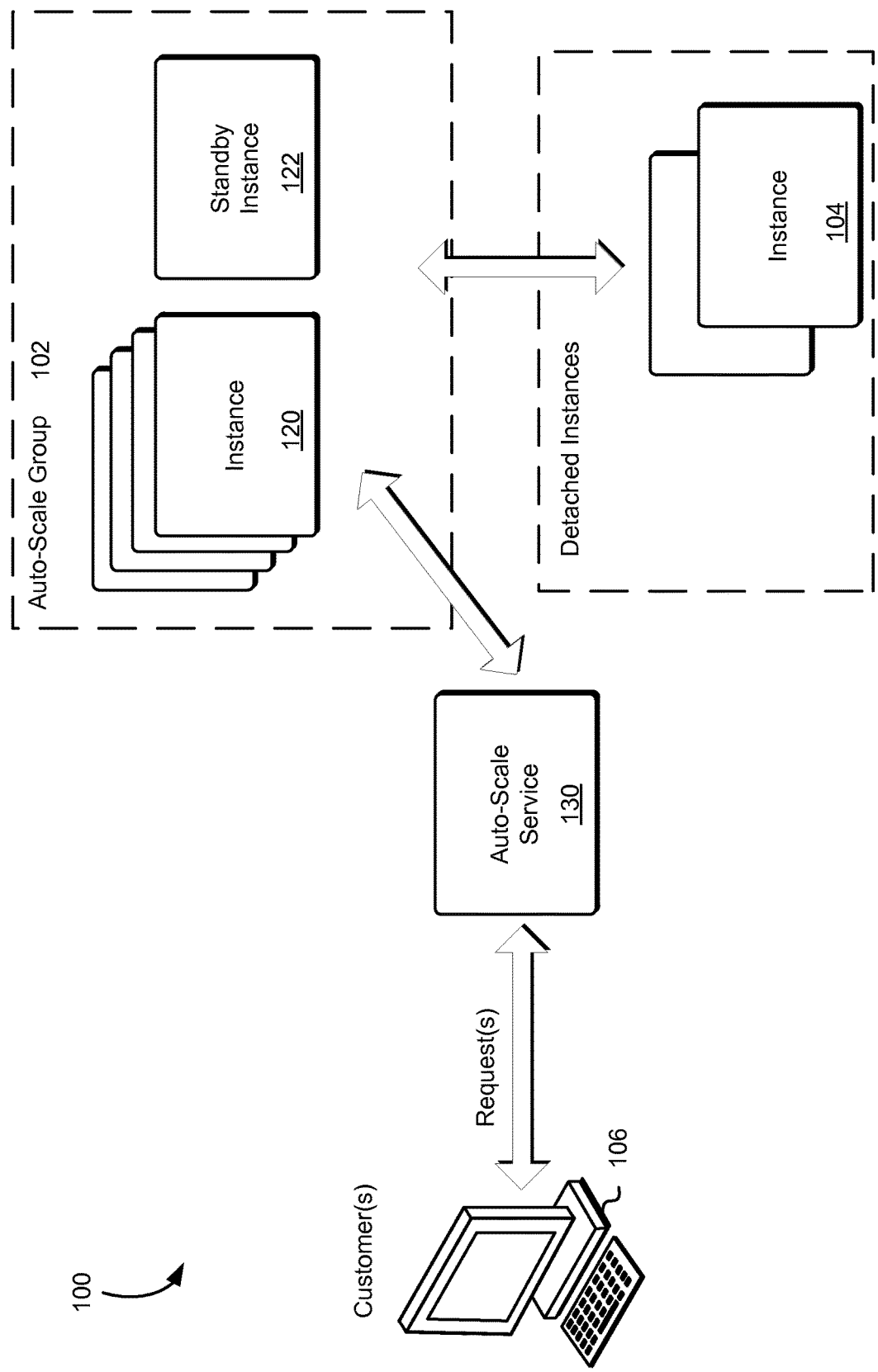
FIG. 1 illustrates an environment in which customers may provide requests to an auto-scaling service to interact with instances included in an auto-scaling group in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to customer management of virtual computer instances or simply instances assigned to an auto-scaling group. A customer of a computing resource service provider that hosts computer systems managed by the customers may create an auto-scaling group to meet resource needs during certain situations, such as unanticipated traffic spikes or need for immediate responses to satisfy increased loads. The auto-scaling group may manage the resources for one or more instances created by the customer. An auto-scaling service may automatically and dynamically manage the auto-scaling group in order to manage computing resources or any resources that might be subject to demand fluctuation. For example, the auto-scaling service may use various factors to determine to automatically and dynamically adjust and/or allocate resources in response to an event, such as load on the group exceeding a threshold. Furthermore, the customer may also need to adjust and/or allocate resources in response to an event and/or manage an instance assigned to the auto-scaling group. The customer may interact with the auto-scaling service by transmitting requests to the computing resource service provider. The request may include a command, application programming interface (API) call, remote procedure call (RPC) or other instruction configured to cause a service of the computing resources service provider to perform various functions.

For example, the customer may submit a request configured to place an instance from the auto-scaling group into standby. Placing the instance in standby may have a variety of different effects on the operation and functions of both the instance and the auto-scaling group. For example, the instance may not contribute to the auto-scaling group's capacity and therefore may not be a factor when adjusting and/or allocating resources in response to an event. In other words, operation of the instance may not be taken into account for any heuristics that are used to determine auto-scaling behavior. In another example, the standby instance may not have various operations to perform, such as a health check, status check, or other operations performed on instances that are in service within the auto-scaling group. However a standby instance may continue to be managed by the auto-scaling service and may be described to the customer as within the auto-scaling group. Placing an instance into standby may allow customers to move instances into standby in the auto-scaling group, optionally instantiate a replacement instance, and interact with the standby instance using one or more other services of the service provider. For example, the customer may interact with the standby instance through an instance service and perform tests of the standby instance, upgrade software of the standby instance, or any other interactions enabled by the instance service. Standby instances may continue to run on the server computer systems implementing the standby instances. Running instances (including standby instances) can be accessed by customers (e.g., by remotely streaming display data of the instances), receive customer input, execute background application, continue to perform operations, receive input from one or more services of the computing resource service provider, provide information to the customer or one or more services of the computing resource service provider, or any other operations that the instances may perform.

The standby instance may continue to be managed by the auto-scaling service as part of the auto-scaling group, but the standby instances may be removed from a load balancer associated with the auto-scaling group and may no longer contribute to metrics information obtained by a metrics service associated with the auto-scaling group. The metrics service, described in greater detail below, may obtain information corresponding to load, resource utilization, and other information corresponding to the instance or a server computer implementing the instance. Furthermore, the customer can then move the standby instances back into service within the auto-scaling group. For example, the customer may place an instance which is in an error state into standby (optionally instantiate a replacement instance), the standby instance may no longer impact the operation of the other instances in the auto-scaling group, then the customer may determine the cause of the error state. Once the determination is made the customer may then move the standby instance back into the auto-scaling group or may terminate the standby instance. In another example, the customers may place the instance into standby in order to perform incremental deployments of software or software upgrades. The customer may perform a software update on the standby instance and then return the instance to service in the auto-scaling group.

Other functions provided to the customer may include detaching an instance from the auto-scaling group. Detaching an instance may allow the customer to remove an executing instance from the auto-scaling group. Removing the executing instance from the auto-scaling group may include de-registering the executing instance from the load balancer associated with the auto-scaling group. Furthermore, the detached instance may not contribute to metrics corresponding to the auto-scaling group. In various embodiments, the detached instance is also not managed by the auto-scaling service and is not described to the customer as a member of the auto-scaling group. The detach function may allow the customers to move a particular instance from one auto-scaling group to another auto-scaling group (by detaching an instance from a first auto-scaling group and then attaching the instance to a second auto-scaling group), or removing the particular instance from auto-scaling completely.

FIG. 1 illustrates an environment 100 in which customers 106 may provide requests to an auto-scaling service 130 to interact with instances 120 include in an auto-scaling group 102. The auto-scaling service 130 may be provided to the customers 106 by a computing resource service provider. The computing resource service provider may provide a variety of services to the customers 106 and the customers 106 may communicate with the computing resource service provider via an interface (not shown in FIG. 1), which may be a web services interface or any other type of customer interface. Although only the auto-scaling service 130 is shown in FIG. 1, the computing resource service provider may provide a variety of services to the customers 106. Furthermore, each service may have its own interface and, generally, subsets of the services may have corresponding interfaces in addition to or as an alternative to a single interface for the computing resource service provider. The customers 106 may be organizations that may utilize one or more of the services provided by the computing resource service provider to maintain and deliver information to employees, which may be located in various geographical locations. Additionally, the customers 106 may be individuals who utilize the services of the computing resource service provider to deliver content to a working group located remotely. The customers 106 may communicate with the computing resource service provider through a network, whereby the network may be a communication network, such as the Internet, an intranet or an Internet service provider (ISP) network. Some communications from the customers to the computing resource service provider may cause the computing resource service provider to operate in accordance with one or more embodiments described herein or a variation thereof.

Additionally, at least a portion of the communications from the customers 106 may include requests configured to cause the computing resource service provider or component thereof to perform various operations. For example, the customer 106 may provide the auto-scaling service 130 with an API call to move one or more instances into standby. Standby instances 122 may be continue to be assigned to and managed by the auto-scaling group 102 but may not contribute to a capacity of the auto-scaling group and may not be included in auto-scaling activities, such as allocating or deallocating resources to the auto-scaling group. The API call may include information suitable for identifying the one or more instances to be placed into standby, information suitable for identifying the auto-scaling group 102 associated with the identified instances. The information suitable for identifying the one or more instances may include an assigned name or tag associated with the instance, an address of the instance, a customer associated with the instance, or other metadata suitable for identifying an instance. Furthermore, the auto-scaling group 102 may be determined based at least in part on information associated with the API call including an auto-scaling group 102 corresponding to the identified instances, an auto-scaling group 102 corresponding to a customer 106 associated with the request, or other information suitable for determining an auto-scaling group 102. In various embodiments, the API call further includes an indication of whether the auto-scaling service 130 is to decrement the capacity of the auto-scaling group 102 or instantiate additional instances and/or computing resources to maintain the current capacity of the auto-scaling group 102. Similarly, the customer 106 may move detached instances 104 into service with the auto-scaling group 102. For example, the customer 106 may provide the auto-scaling service 130 with an API call to place one or more detached instances 104 in service. The API call may include information suitable for identifying the one or more detached instances 104 to be placed in service.

In response to the API call the auto-scaling service 130 may perform various operations in order to place instances into standby. For example, the auto-scaling service 130 may validate at least a portion of the API call. In another example, the auto-scaling service 130 may transmit commands to other services of the computing resource service provider, such as an instance service, a database service, or other service suitable for performing operations in order to place instances into standby. In various embodiments, in response to an API call the auto-scaling service initiates a workflow that moves one or more instances indicated by the API call into standby. The workflow may include a set of steps to be performed in order to execute the API call. The workflow may be executed synchronously or asynchronously. Additionally, in response to an API call from the customers 106, the computing resource service provider or component thereof may provide the customers 106 with job identification information configured to enable the customer to determine the status of a workflow. Upon completion of the workflow, the API call may be completed and a notification may be transmitted to the customer 106. For example, the customer 106 may transmit an API call to detach a particular instance 120 from an auto-scaling group 102. The auto-scaling service 130 may initiated a workflow to detach the instance 120 and upon completion of the workflow the auto-scaling service 130 or other service, such as a notification service, may provide the customer 106 with a notification indicating that the instance 120 has been detached from the auto-scaling group 102.

The notification service may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service may provide notifications to clients using a "push" mechanism without the need to periodically check or "poll" for new information and updates. The notification service may further be used for various purposes such as monitoring applications executing in the auto-scaling service 130, workflow systems, time-sensitive information updates, mobile applications, and many others.

The environment such as that illustrated in FIG. 1 may be useful for a provider such as a computing resource provider, wherein the computing resource system responds to requests from customers to manage instances assigned to auto-scaling groups. As discussed above, the computing resource system provides a mechanism to allow customers to place instances in and/or out of standby as well as detach and attach instances from auto-scaling groups. The environment in such a case may include additional components and/or other arrangements, such as those illustrated in the networked environment 200 of FIG. 2. In this example, the networked environment 200 includes a computing resource service provider 204 in data communication with a client device 206 and server computers 242 over a network 206. In one embodiment, the server computers 242 may be one or more computer hardware devices that are used to implement instances 220. For example, the server computers 242 may include hardware for implementing types of computing resources, such as storage devices, virtualized storage devices, networking devices, and the like. Additionally, the implemented computing resources may be programmatically and remotely managed by a customer of the distributed computing resource provider.

The server computers 242 includes a plurality of computer system devices that are each capable of executing one or more instances 220 created by the distributed computing resource service provider 204. In one embodiment, each of the server computers 242 includes a processor, a data store, an input/output bus, and/or any other component known in the art for executing instances 220. Additionally, the instances 220 may be virtual machine instances. As known in the art, a virtual machine instance is an instance of a software implementation on a machine (i.e., a computer) that executes programs like a physical machine. For example, each of the server computers 242 may be configured to execute an instance manager 218 capable of implementing the instances 220. The instance manager 218 may be a hypervisor, virtualization layer, or another type of program configured to enable the execution of multiple instances 220 on a single server computer 242, for example. As discussed above, each of the instances 220 may be configured to execute all or a portion of an application. Additionally, the network 206 may be similar to the network as described above. The networked environment 200 may span one or more data centers, where each data center may be geographically distinct from each other. Additionally, the networked environment 200 shown in FIG. 2 may be one of several embodiments employed by the computing resource service provider.

In one embodiment, the computing resource service provider 204 includes a data store containing resource data 210, an instance service 212, a placement service 226, an auto-scaling service 230, a maintenance service 232, a metrics service 234, a load balancing service 236, and/or other components. The resource data 210 may include data related to the server computers 242. For example, in one embodiment, the resource data 210 includes one or more records of server computer data 246. Each one of the records of the server computer data 246 corresponds to the server computers 242 of the networked environment 200.

The instance service 212 instantiates instances 220 based at least in part on a set of preferences provided by the customer. In one embodiment, the instance service 212 receives, from the customer on the client device 206, a request 236 to create one or more instances 232 and optionally assign the created instances 220 to an auto-scaling group 202. Additionally, the request 236 received from the customer on the client device 206 may also indicate a time to start execution of the requested instances 220. In response to receiving the request, the instance service 212 instantiates instances 220. In various embodiments, the auto-scaling service 230 receives the request and transmits a command to the instance service 212 to instantiate the instances 220 such that the instances are associated with the auto-scaling group, for example, by associating auto-scaling group 202 metadata with the instances 220. In one embodiment, the instance service 212 may place instances in standby or detach instances from the auto-scaling group in response to a request from the client device 206 and/or auto-scaling service 203. For example, the auto-scaling service 230 may transmit a request to the instance service 212 to remove the auto-scaling group 202 metadata associated with the instances 220 being detached from the auto-scaling group 202 according to the request 236.

Figure 2:
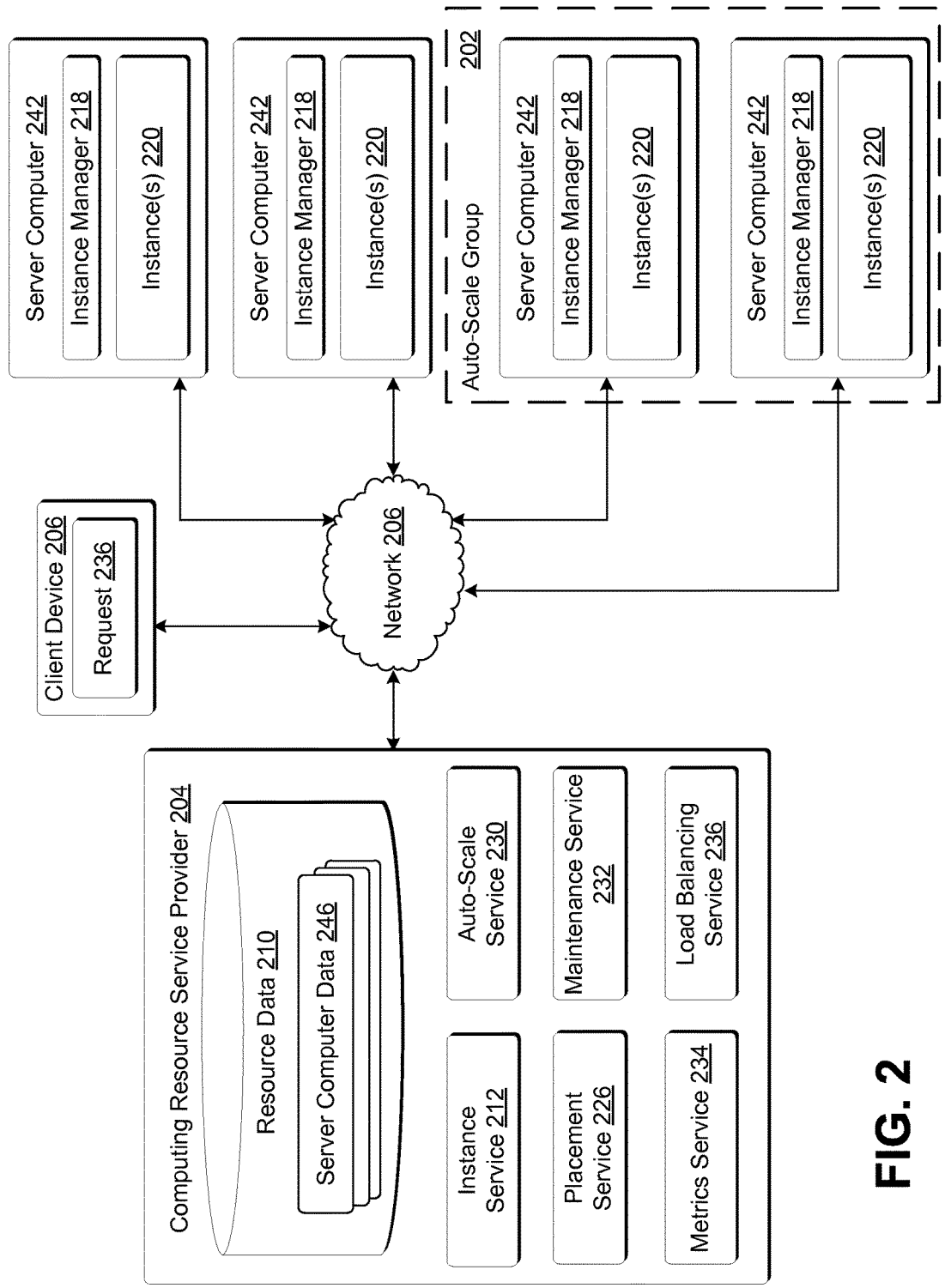
FIG. 2 illustrates a system for instantiating instances and provisioning the instances to a set of implementation resources for an auto-scaling group in accordance with an embodiment.

The customer may interact with the computing resource service provider 204 (via appropriately configured and authenticated API calls) to provision, operate virtual, and manage instances that are instantiated on server computers 242 and operated by the computing resource service provider 204. Additionally, the customer may create one or more auto-scaling groups 202, the auto-scaling groups 202 may be a logical collection of instances 220. Furthermore, the instances 220 may be assigned to the auto-scaling group 202 or may be members of the auto-scaling group 202. The auto-scaling service 230 may allow customers to interact with and manage various auto-scaling groups 202. For example, the customer may, through the auto-scaling service 230, set a maximum or minimum capacity for an auto-scaling group 202. The autos-scaling group 202 may then manage the instances 220 assigned to the auto-scaling group in order to maintain the settings provided by the customer. In various embodiments, the customer may create and manage auto-scaling groups 202 through a management console provided by the computing resource service provider 204. The management console may be exposed to the customers as a webpage, by interacting with the webpage (e.g., through a browser application) the customer may cause API calls to be generated. The generated API calls may cause the computing resource service provider 204 or component thereof to perform various operations indicated by the customer. Once the instances have been placed in standby or detached from the auto-scaling group 202, the customer may still interact with the instances 220 by submitting request 236. The requests 236, in this case, may be processed by the instance service 212 or other component of the computing resource service provider 204. For example, once instances 220 have been detached from the auto-scaling group 202, the customer may submit a request 236 to the instance service 212 to terminate the instance 220. The instances 220 may be used for various purposes, such as to operate as servers supporting a website, to operate business applications or, generally, to serve as computing power for the customer. Other applications for the instances 220 may be to support database applications, electronic commerce applications, business applications and/or other applications. Although the instance service 212 is shown in FIG. 2, any other computer system or computer system service may be utilized by the computing resource service provider 202, such as a computer system or computer system service that does not employ virtualization or instantiation and instead provisions computing resources on dedicated or shared computers/servers and/or other physical devices.

The placement service 226 provisions the instances 220 to one or more of the server computers 242. In one embodiment, the placement service 226 determines the server computers 242 to provision the new instances 220 based at least in part on the indicated auto-scaling group 202 of the new instances 220. For example, the placement service 226 may identify one or more server computers 242 with the appropriate capacity to execute the instances 220. To this end, the placement service 226 determines the capacity of each server computer 242 from the resource data 210 stored in the data store and accordingly provisions the instances 220, as will be described. The auto-scaling service 230 automatically scales the capacity of a collection of previously requested instances 220 up or down based at least in part on circumstances defined by the customer that requested the instances 220. For example, the auto-scaling service 230 may decrease the number of instances 220 allocated to the customer during demand lulls and increase the number of instances 220 allocated to the customer during demand peaks. In one embodiment, the auto-scaling service 230 sheds a subset of the requested instances 220 during a period of low usage and/or idle time. For example, the auto-scaling service 230 may determine that the amount of instances 220 requested by the customer is redundant and/or excessive. In response, the auto-scaling service 230 may terminate a certain number of instances 220 allocated to the customer such that the remaining number of instances 220 allocated to the customer is not redundant and/or excessive. In another embodiment, the auto-scaling service 230 may shed the subset of the requested instances 220 if the usage rate does not exceed a predetermined threshold. Similarly, the auto-scaling service 230 increases the amount of instances 220 during a period of high usage. In one embodiment, the auto-scaling service 230 may increase the amount of instances 220 if the usage rate exceeds a predetermined threshold.

The maintenance service 232 schedules maintenance, software updates, and/or firmware updates for the server computers 242. In one embodiment, the maintenance service 232 schedules the maintenance and software updates at an appropriate time based at least in part on the available capacity of the server computers 242. For example, the maintenance service 232 may schedule the maintenance and software updates at a time when the respective server computer 242 has a projected availability. In one embodiment, the maintenance service 232 may patch and restart the server computers 242 when the maintenance service 232 determines that the server computer 242 is not hosting any instances 220. Additionally, the maintenance service 232 may patch virtual machines associated with the instance 242 if necessary prior to instantiating new images that are associated with the respective virtual machines. For example, the maintenance service 232 may schedule a patch of the machine image based at least in part on the health status of the instances 220. In one embodiment, no additional instances may be provisioned on the server computer 242 until the scheduled maintenance is completed.

The maintenance service 232 may also periodically or aperiodically check the health status of the instances 220, including instances assigned to the auto-scaling group 202. The health check may include determining the load, utilization, and operation of various components of the instances 220 such as the central processing unit, memory, networking interface, operating system, application, and other components of the instances 220. In various embodiments, when the maintenance service 232 determines that an instance 220 is unhealthy, based at least in part on the health check, the maintenance service 232 or other component of the service provider 204, such as the auto-scaling service 230, may initiate a workflow to move the unhealthy instances into standby or detach the unhealthy instance from the auto-scaling group 202. Additionally, if the maintenance service 232, determines that a previously unhealthy instance 220 has returned to a healthy status the maintenance service 232 or other component of the service provider 204, such as the auto-scaling service 230, may move the instances 220 into service or attach the instances 220 to the auto-scaling group 202.

The metrics service 234 may be responsible for collecting resource data 210 corresponding to the instances 220. The resource data 210 obtained by the metrics service 234 may indicate the utilization of various components of the instances 220 such as the central processing unit, memory, networking interface, operating system, applications, and other components of the instances 220. This information may be used for a variety of different purpose, for example, determining whether to allocate or deallocate resources to the auto-scaling group 202. Additionally, the information may be used by the maintenance service 232 to determine the health of an instance 220 and/or a server computer 242. The metrics service 234 may obtain and aggregate utilization information for all of the instances 220 assigned to the auto-scaling group 202. Furthermore, when instances 220 are placed in standby or detached from the auto-scaling group 220, the metrics service 234 may receive a command to remove the instances 220 from the set of instances 220 for which the metrics service 232 collects and/or aggregates utilization information for.

A load balancer service 236 may be offered to customers of a computing resource service provider 204 in order to facilitate request processing by instances 220 of the customer. In various embodiments, the instances 220 may be assigned to the auto-scaling group 202 and the load-balancer service 236 may distribute traffic to the instances 220 assigned to the auto-scaling group 202. For example, the customer may operate a website using instances 220 assigned to the auto-scaling group 202 using the resources of computing resource service provider 204. Additionally, the website may receive requests from multiple other customers over the network 206. The computing resource service provider 204 may configure a load balancer of the load balancer service 236 to direct the requests to the instances 220 of the auto-scaling group 202 executing the website in such a way that the load generated by processing the requests is distributed among the instances 220 of the auto-scaling group 202 executing the website. The load balancer service 236 may be a computer system or virtual computer system configured to distribute the request to the instances 220 assigned to the load balancer in order to optimize resource utilization and/or avoid overloading a particular server computer 242. For example, the load balancer may include physical hardware connected to a server rack or otherwise included in a data center. In another example, the load balancer may include one or more virtual machines supported by server computer 242.

Figure 3:
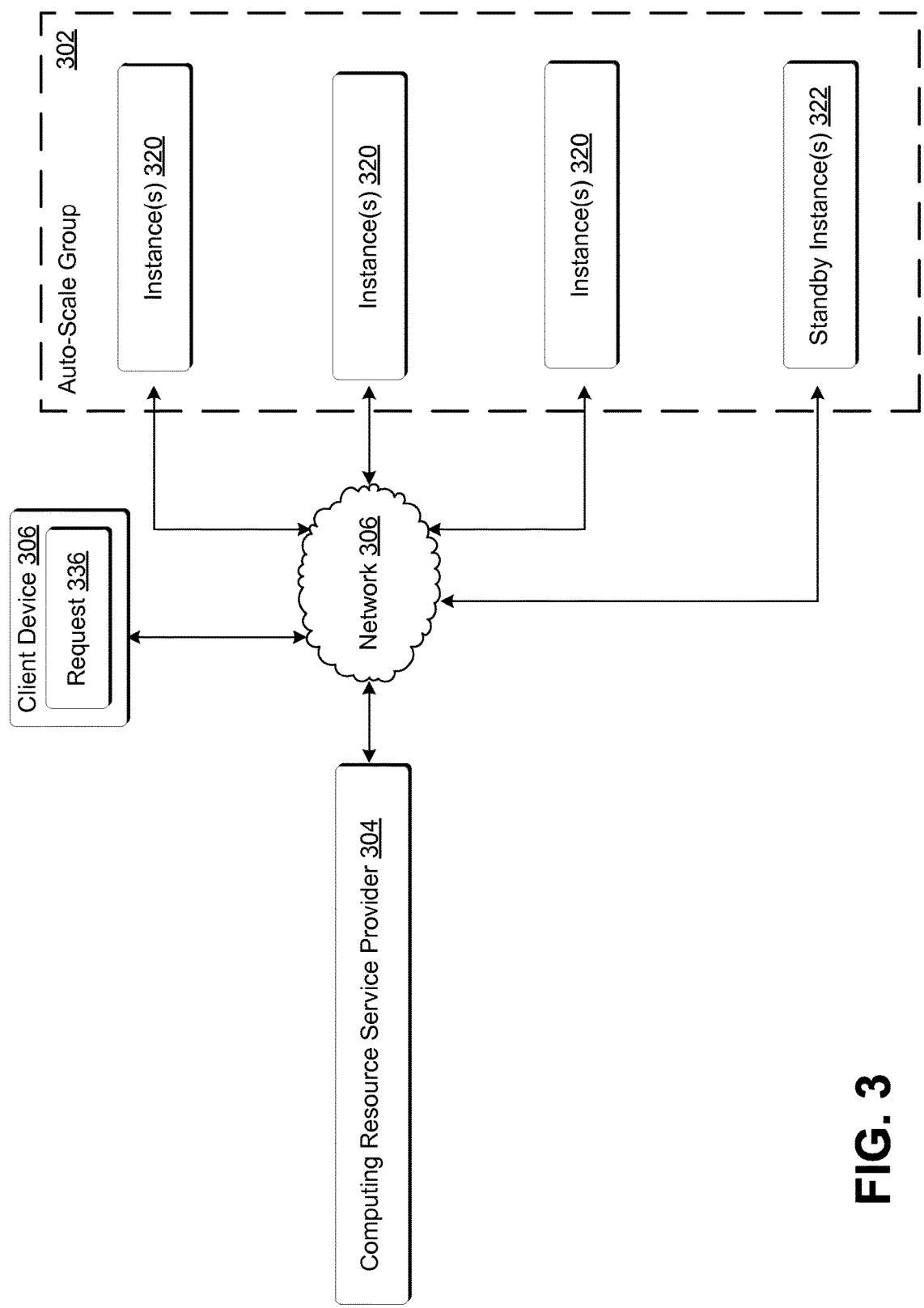
FIG. 3 illustrates a system for placing an instantiated instance of an auto-scaling group into standby in accordance with an embodiment.

FIG. 3 shows an example of a customer connected, through a client device 306, to a computing resource service provider 304 in accordance with at least one embodiment. The computing resource service provider may contain any of the services and/or components described above in connection with FIG. 2, such as the instance service and auto-scaling service, as well as any other services or components suitable for placing an instance 320 into standby or moving a standby instance 322 into service. The instances 320 may be any of the computer systems described above. Furthermore, the instances 320 may be assigned, as illustrated in FIG. 3, to an auto-scaling group 302. The auto-scaling group 302 may be configured, as described above, to allocate or deallocate additional resources in response to certain events. The customer may interact with the instances 320 and auto-scaling group 302 by submitting, through the client device 306, requests 336. For example, the request 336 may include an API call to move an instance 320 into standby.

The request 336 may include identification information for the instances 320 to be moved into standby, identification information for the auto-scaling group 302 to which the instances 320 is assigned, and an indication of whether to decrement a capacity of the auto-scaling group 302. The request 336, once received, may cause the computing resource service provider 304 or components thereof, such as the instance service and/or auto-scaling service, to initiate a workflow to place the indicated instances 320 into standby. The workflow, described in greater detail below, once completed may result in the instances 320 being placed in standby such that the instances 320 may be considered standby instances 322. Standby instances 322 may still be managed by the auto-scaling service as if a member of the auto-scaling group 302. For example, the maintenance service, as described above, may still perform health checks on the standby instances 322. In various embodiments, however, the standby instances may not contribute to the auto-scaling groups 302 metrics and may not be factored in determining the capacity of the auto-scaling group.

The computing resource service provider 304 may still allow the client device 306 to interact with the standby instances 322. For example, the client device 306 may transmit software or other executable code to be executed by the standby instance 322. In another example, the client device 306 may transmit a request 336 to obtain information from the standby instances 322, such as an operational state or data stored by the standby instances 322. Furthermore, standby instances 322 may be placed in service in response to a request 336 from the client device 306. For example, the customer may upgrade the operating system of a standby instance 322 and then transmit a request to the computing resource service provider 304 to place the standby instance 322 in service in the auto-scaling group 302. The computing resource service provider 304 or component thereof may then initiate a workflow to place the standby instance 322 in service as described in greater detail below. In various embodiments, the customer may maintain a set of standby instances 322 in the auto-scaling group 302 such that the customer may increase capacity of the auto-scaling group by moving at least a portion of the standby instances 322 in service.

Figure 4:
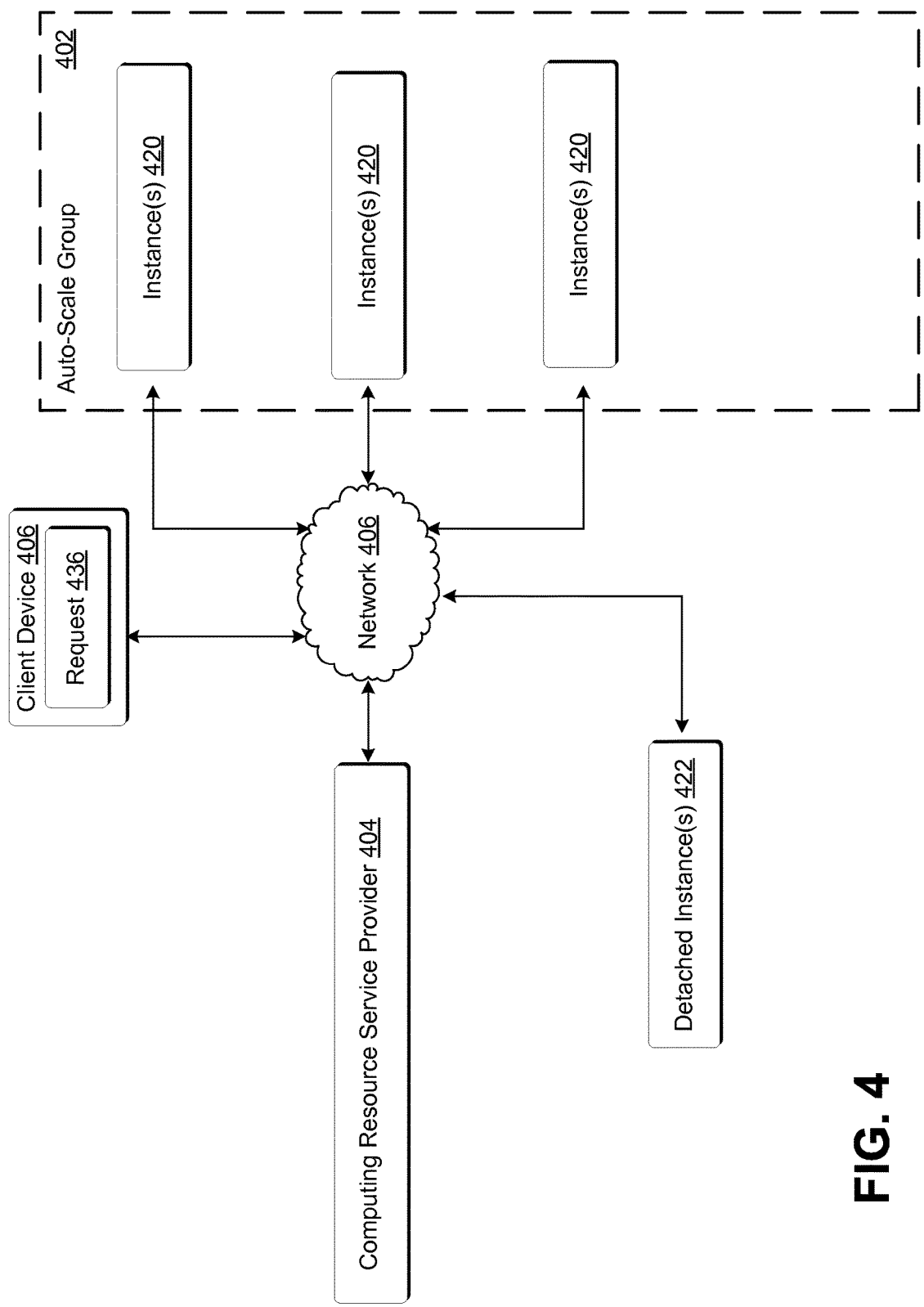
FIG. 4 illustrates a system for detaching an instantiated instance of an auto-scaling group in accordance with an embodiment.

FIG. 4 shows an example of a customer connected, through a client device 406, to a computing resource service provider 404 in accordance with at least one embodiment. The computing resource service provider may contain any of the services and/or components described above in connection with FIG. 2, such as the instance service and auto-scaling service, as well as any other services or components suitable for detaching an instance 420 or attaching a detached instance 422 to an auto-scaling group 402. The instances 420 may be any of the computer systems described above. Furthermore, the instances 420 may be assigned, as illustrated in FIG. 4, to the auto-scaling group 402. The auto-scaling group 402 may be configured, as described above, to allocate or deallocate additional resources in response to certain events. The customer may interact with the instances 420 and auto-scaling group 402 by submitting, through the client device 406, requests 436. For example, the request 436 may include an API call to detach an instance 420 from the auto-scaling group 402.

The request 436 may include identification information for the instances 420 to be moved into standby, identification information for the auto-scaling group 402 to which the instance 420 is assigned, and an indication of whether to decrement a capacity of the auto-scaling group 402. The request 436, once received, may cause the computing resource service provider 404 or components thereof, such as the instance service and/or auto-scaling service, to initiate a workflow to detach the indicated instances 420 from the auto-scaling group 402. The workflow, described in greater detail below, once completed may result in the instances 420 being detached from the auto-scaling group 402 such that the detached instances 422 may be considered as not part of the auto-scaling group 402 and not managed by the auto-scaling group 402. Standby instances, as opposed to detached instances 422, may still be managed by the auto-scaling service as if a member of the auto-scaling group 402.

The computing resource service provider 404 may still allow the client device 406 to interact with the detached instances 422. For example, the client device 406 may transmit software or other executable code to be executed by the detached instance 422. In another example, the client device 406 may transmit a request 436 to obtain information from the detached instances 422, such as an operational state or data stored by the detached instances 422. Furthermore, detached instances 422 may be attached to the auto-scaling group 402 or another auto-scaling group in response to a request 436 from the client device 406. For example, the customer may detach an instance 420 from one of the customer's auto-scaling groups 402 and attach the instance 420 to another of the customer's auto-scaling groups. The request 436 to attach an instance may cause the computing resource service provider 404 to initiate a workflow configured to attach the indicated instance to a particular auto-scaling group described in greater detail below.

Figure 5:
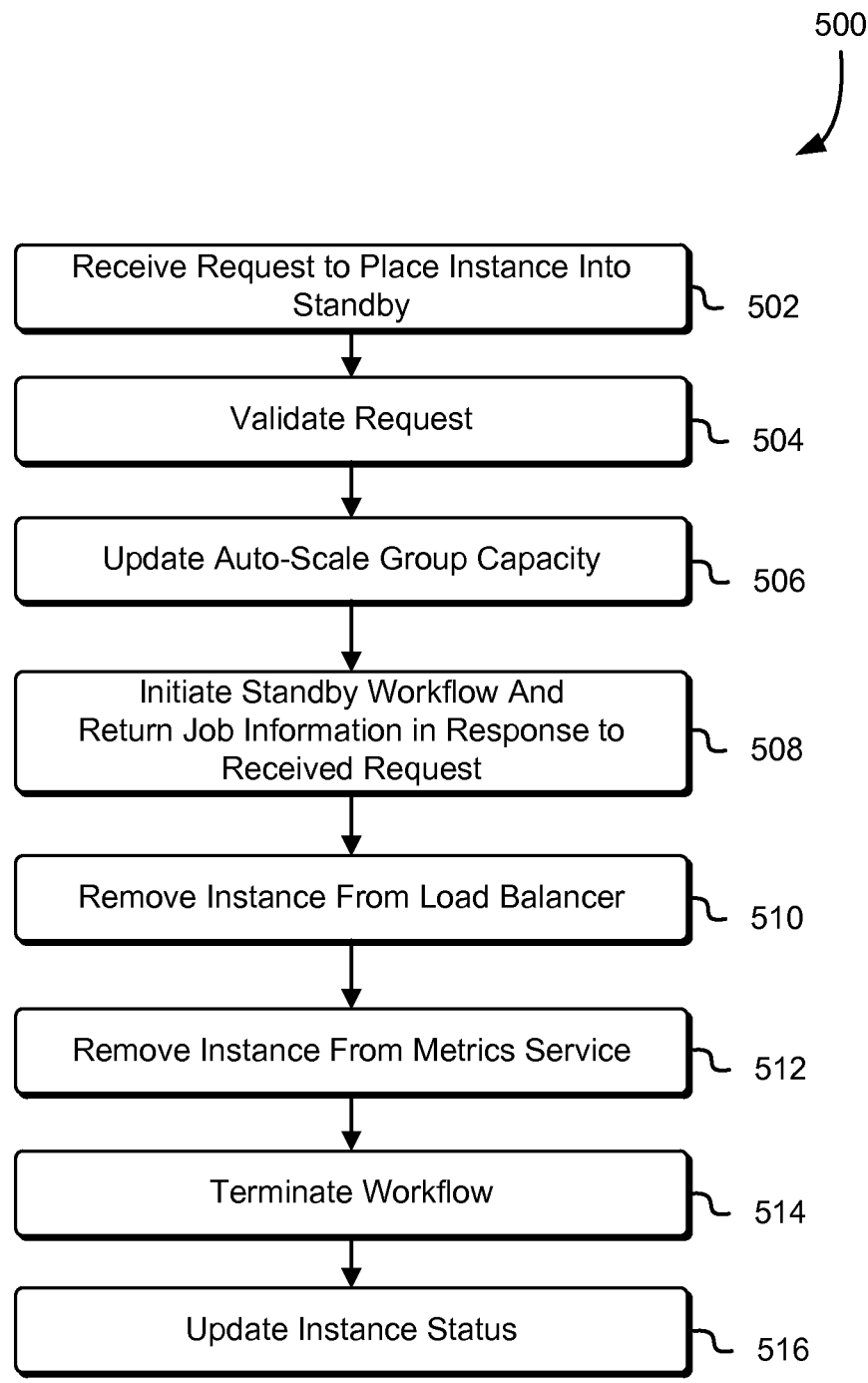
FIG. 5 is an illustrative example of a process for placing an instantiated instance of an auto-scaling group into standby in accordance with an embodiment.

FIG. 5 shows an illustrative example of a process 500 which may be used to place one or more instances of an auto-scaling group into standby. The process 500 may be performed by any suitable system or combination of systems such as the auto-scaling service and other components of the computing resource service provider described above in connection with FIG. 2. Returning to FIG. 5, in an embodiment, the process 500 includes receiving a request to place an instance into standby 502. The request may include an API call configured to cause the computing resource service provider to move an instance into standby. The API call may include at least information identifying the instance and/or instances to be moved into standby. The auto-scaling group to which the instance belongs may be determined based at least in part on the identification information provided in the API call or information associated with the customer responsible for providing the API call.

The received request may then be validated by the computing resource service provider or component thereof 504. Validating the request may include determining the number of instances included in the request is less than the maximum allowed or the total number of instance in the auto-scaling group, determining that all the instances included in the request are members of the auto-scaling group, determining that all the instances included in the request are in service (e.g., not in standby, detached, terminated, or otherwise in a state that is not capable of being moved to standby), and determining a new capacity of the auto-scaling group and that the determined new capacity is not below a threshold value. Once the request has been validated, the auto-scaling service may update the auto-scaling group's capacity 5062. Updating the auto-scaling group's capacity may include determining a new value for the capacity of the auto-scaling group not including the instance being placed in standby. In another example, updating the auto-scaling group's capacity may include instantiating a replacement instance for the instance being placed into standby and assigning the replacement instance to the auto-scaling group. The auto-scaling service may then initiate a standby workflow 508 and return in response to the request job information associated with the workflow. The job information may enable the customer to determine the status of the workflow. Furthermore, the workflow may be configured to execute a variety of operations and communicate with one or more components of the computing resource service provider in order to place the instance into standby.

As illustrated by the process 500, the workflow may include removing the instance from a load balancer 510. Removing the instance may include deregistering the instance with a load balancer or load balancer service as described above. Additionally, the instance may be removed from the set of instances of the auto-scaling group contributing to the metrics for the group 512. For example, as described above, a metrics service may obtain utilization information corresponding to the set of instances assigned to the auto-scaling group. The workflow may then terminate 514. Terminating the workflow may include transmitting a notification to the customer and/or one or more services of the computing resource service provider that the instance has been placed in standby. In numerous variations to the process 500, the workflow to place the instance in standby may include additional operations or fewer operations as required by the system to place the instance into standby. Returning to FIG. 5, the auto-scaling service may update the status of the instance to standby 516. Updating the status of the instance may include updating metadata associated with the instance and maintained by the auto-scaling service. The instance in standby may continue to be implemented by the computing resource service provider and may still receive commands from the customer.

Figure 6:
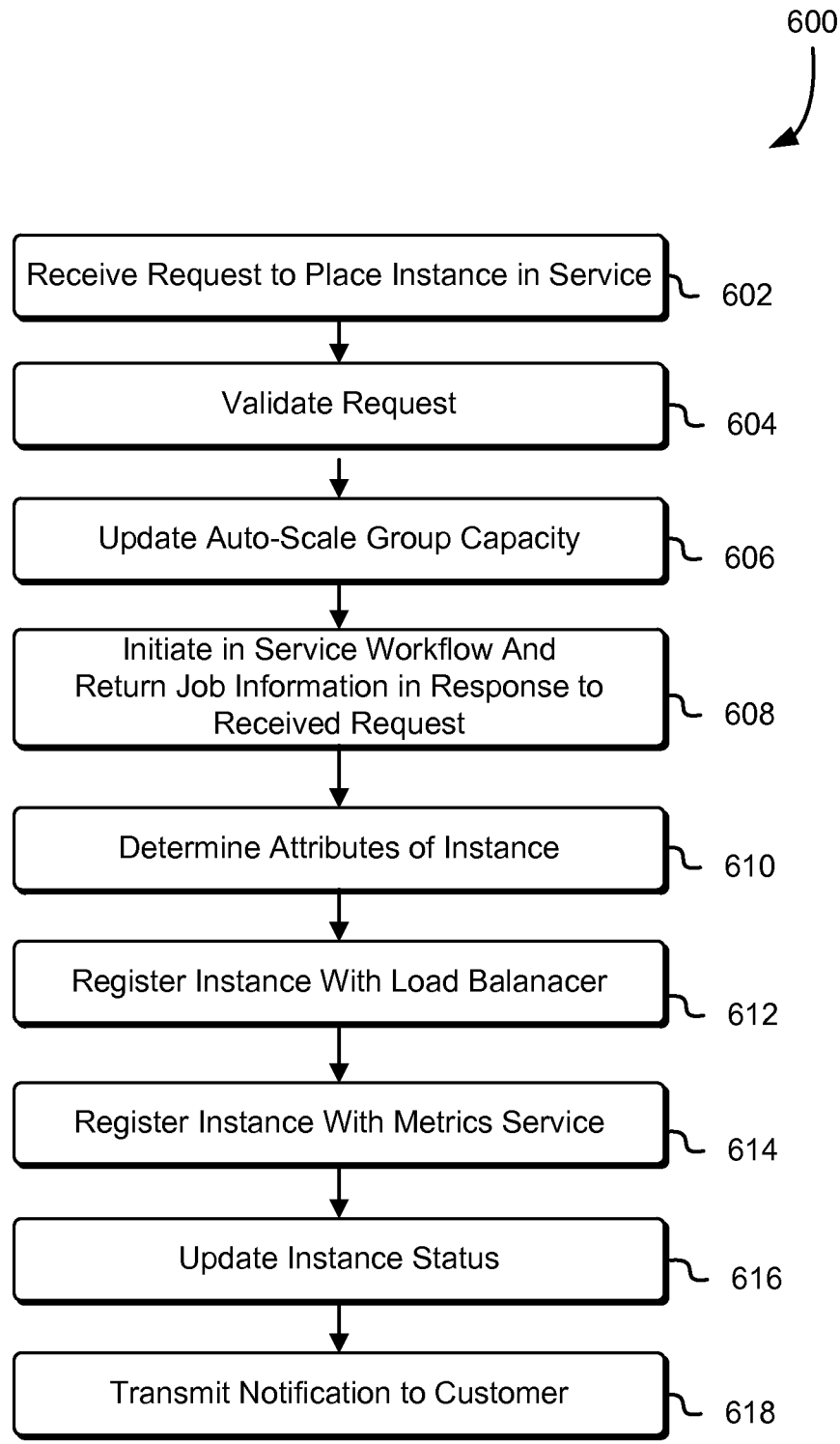
FIG. 6 is an illustrative example of a process for placing a standby instance of an auto-scaling group in service for the auto-scaling group in accordance with an embodiment.

FIG. 6 shows an illustrative example of a process 600 which may be used to place one or more standby instances of an auto-scaling group into service in the auto-scaling group. The process 600 may be performed by any suitable system or combination of systems such as the auto-scaling service and other components of the computing resource service provider described above in connection with FIG. 2. Returning to FIG. 6, in an embodiment, the process 600 includes receiving a request to place a standby instance into service 602. The request may include an API call configured to cause the computing resource service provider to move the standby instance into service for the auto-scaling to which the standby instance is assigned. The API call may include at least identifying information of the instance and/or instances to be moved into service. The auto-scaling group to which the standby instance is assigned may be determined based at least in part on the identification information provided in the API call or information associated with the customer responsible for providing the API call or may be included in the API call.

The received request may then be validated by the computing resource service provider or component thereof 604. Validating the request may include determining the number of standby instances included in the request is less than the maximum allowed or the total number of instances in the auto-scaling group, determining that all the standby instances included in the request are members of the auto-scaling group, determining that all the standby instances included in the request are in standby (e.g., not in service, detached, terminated, or otherwise in a state that is not capable of being moved out of standby), and determining a new capacity of the auto-scaling group and that the determined new capacity is not below or above a threshold value. Once the request has been validated, the auto-scaling service may then update the auto-scaling group's capacity 606. Updating the auto-scaling group's capacity may include determining a new value for the capacity of the auto-scaling group including the standby instance being placed in service. The auto-scaling service may then initiate an in service workflow 608 and return in response to the request, job information associated with the workflow. The job information may enable the customer to determine the status of the workflow. Furthermore, the workflow may be configured to execute a variety of operations and communicate with one or more components of the computing resource service provider in order to place the instance in service.

As illustrated by the process 600, the workflow may include determining attributes of the standby instance 6010. The attributes may include metadata associated with the standby instance and/or the auto-scaling group, IP address of the standby instance, operation state of the instance, or other attribute suitable for bringing the standby instance into service. The workflow may continue by adding the standby instance to a load balancer 612 associated with the auto-scaling group. This may include registering the standby instance with a load balancer or load balancer service as described above. Furthermore, the standby instance may be registered with the load balancer in such a way that the standby instance does not receive traffic from the load balancer for an interval of time, for example, until the workflow is completed. Additionally, the instance may be registered with a metrics service and included in the set of instances of the auto-scaling group contributing to the metrics for the auto-scaling group 614. For example, as described above, the metrics service may obtain utilization information corresponding to the set of instances assigned to the auto-scaling group. The status of the instance may then be updated 616. Updating the status may include updating metadata associated with the instances maintained by the auto-scaling service. The computing resource service provider or component thereof may then transmit a notification to the customer that the instance is in service 618. In numerous variations to the process 600, the workflow to place the standby instance in service may include additional operations or fewer operations as required by the system to place the standby instance into service.

Figure 7:
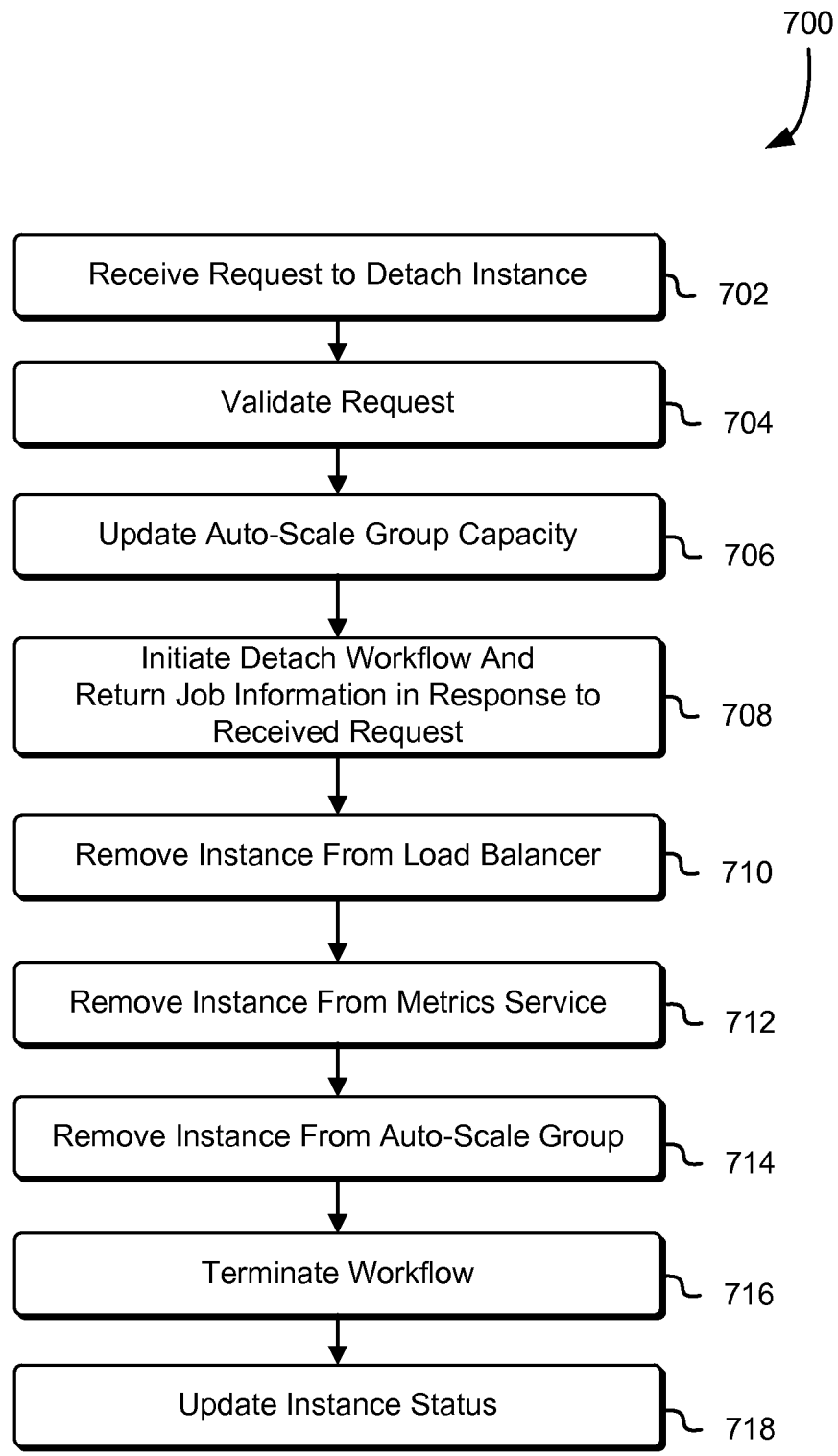
FIG. 7 is an illustrative example of a process for detaching an instantiated instance of an auto-scaling group from the auto-scaling group in accordance with an embodiment.

FIG. 7 shows an illustrative example of a process 700 which may be used to detach one or more instances of an auto-scaling group. The process 700 may be performed by any suitable system or combination of systems such as the auto-scaling service and other components of the computing resource service provider described above in connection with FIG. 2. Returning to FIG. 7, in an embodiment, the process 700 includes receiving a request to detach an instance. The request may include an API call configured to cause the computing resource service provider to detach the instance from the auto-scaling group. The API call may include at least identifying information of the instance and/or instances to be detached. The auto-scaling group to which the instance belongs may be determined based at least in part on the identification information provided in the API call or information associated with the customer responsible for providing the API call.

The received request may then be validated by computing resource service provider or component thereof 704. Validating the request may include determining that the number of instances included in the request is less than the maximum allowed or the total number of instance in the auto-scaling group, determining that all the instances included in the request are members of the auto-scaling group, determining that all the instances included in the request are in service (e.g., not in standby, detached, terminated, or otherwise in a state that is not capable of being moved to standby), and determining a new capacity of the auto-scaling group and that the determined new capacity is not below a threshold value. Once the request has been validated, the auto-scaling service may then update the auto-scaling group's capacity 706. Updating the auto-scaling group's capacity may include determining a new value for the capacity of the auto-scaling group not including the instance being placed in standby. In another example, updating the auto-scaling group's capacity may include instantiating a replacement instance for the instance being placed into standby and assigning the replacement instance to the auto-scaling group. The auto-scaling service may then initiate a detach workflow 708 and return, in response to the request, job information associated with the workflow. The job information may enable the customer to determine the status of the workflow. Furthermore, the workflow may be configured to execute a variety of operations and communicate with one or more components of the computing resource service provider in order to place the instance into standby.

As illustrated by the process 700, the workflow may include removing the instance from a load balancer 7010. Removing the instance may include deregistering the instance with a load balancer or load balancer service as described above. Additionally, the instance may be removed from the set of instances of the auto-scaling group contributing to the metrics for the group 712. For example, as described above, a metrics service may obtain utilization information corresponding to the set of instances assigned to the auto-scaling group. The workflow may then remove the instance from the auto-scaling group 715. Removing the instance from the auto-scaling group may cause the auto-scaling group to no longer manage the instances. For example, the auto-scaling group may no longer run health checks on the instance. The workflow may then terminate 716. Terminating the workflow may include transmitting a notification to the customer and/or one or more services of the computing resource service provider that the instance has been placed in standby. In numerous variations to the process 700, the workflow to detach the instance may include additional operations or fewer operations as required by the system to detach the instance. Returning to FIG. 7, the auto-scaling service may update the status of the instance to detached 718. Updating the status of the instance may include updating metadata associated with the instance and maintained by the auto-scaling service. The detached instance may continue to be implemented by the computing resource service provider and may still receive commands from the customer.

Figure 8:
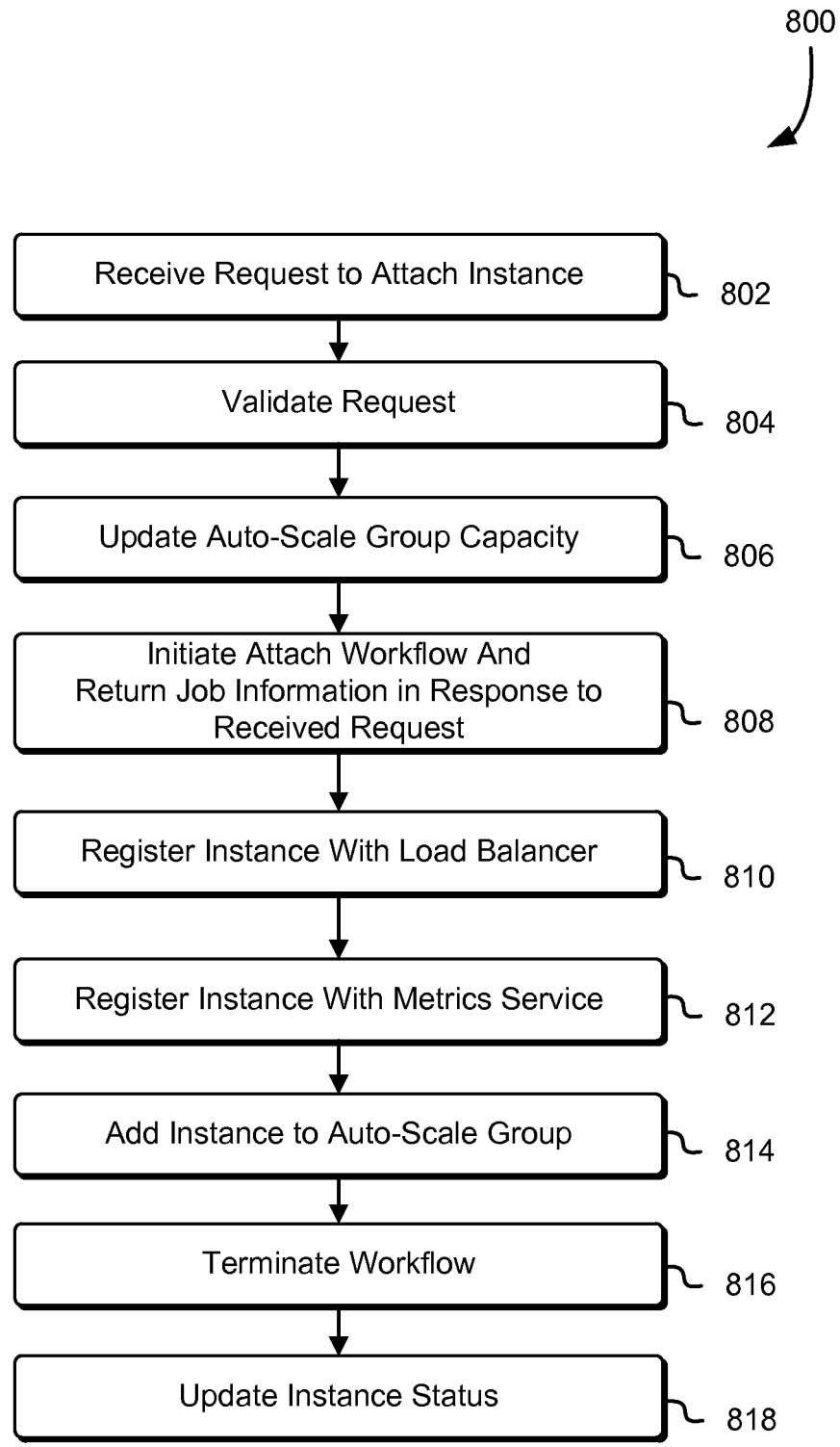
FIG. 8 is an illustrative example of a process for attaching a detached instance of an auto-scaling group to the auto-scaling group in accordance with an embodiment.

FIG. 8 shows an illustrative example of a process 800 which may be used to attach one or more instances to an auto-scaling group. The process 800 may be performed by any suitable system or combination of systems such as the auto-scaling service and other components of the computing resource service provider described above in connection with FIG. 2. Returning to FIG. 8, in an embodiment, the process 800 includes receiving a request to attach an instance to an auto-scaling group 802. The request may include an API call configured to cause the computing resource service provider to attach the instance to the auto-scaling group. The API call may include at least identifying information of the instance and/or instances to be attached. The auto-scaling group to which the standby instance is to be assigned may be determined based at least in part on the identification information provided in the API call or information associated with the customer responsible for providing the API call or may be included in the API call.

The received request may then be validated by computing resource service provider or component thereof 804. Validating the request may include determining the number of instances included in the request is less than maximum allowed or the total number of instances in the auto-scaling group, determining that all the instances included in the request are capable of being members of the auto-scaling group, determining that all the instances included in the request are operational, and determining a new capacity of the auto-scaling group and that the determined new capacity is not above a threshold value. Once the request has been validated, the auto-scaling service may update the auto-scaling group's capacity 806. Updating the auto-scaling group's capacity may include determining a new value for the capacity of the auto-scaling group including the instance being attached to the auto-scaling group. The auto-scaling service may then initiate an attach workflow 808 and return, in response to the request, job information associated with the workflow. The job information may enable the customer to determine the status of the workflow. Furthermore, the workflow may be configured to execute a variety of operations and communicate with one or more components of the computing resource service provider in order to attach the instance to the auto-scaling group.

As illustrated by the process 800, the workflow may include registering the instance with a load balancer 810 associated with the auto-scaling group. This may include registering the instance with the load balancer or a load balancer service as described above. Furthermore, the instance may be registered with the load balancer in such a way that the instance does not receive traffic from the load balancer for an interval of time, for example, until the workflow is completed. Additionally, the instance may be registered with a metrics service and included in the set of instances of the auto-scaling group contributing to the metrics for the auto-scaling group 812. For example, as described above, the metrics service may obtain utilization information corresponding to the set of instances assigned to the auto-scaling group. The workflow may then cause the instance to be added to the auto-scaling group 814. Adding the instance to the auto-scaling group may include associating metadata of the instance with the auto-scaling group. The workflow may then terminate 816. Terminating the workflow may include transmitting a notification to the customer and/or one or more services of the computing resource service provider that the instance has been placed in standby. In numerous variations to the process 800, the workflow to detach the instance may include additional operations or fewer less operations as required by the system to detach the instance. Returning to FIG. 8, the status of the instance may then be updated 818. Updating the status may include updating metadata associated with the instances maintained by the auto-scaling service.

Figure 9:
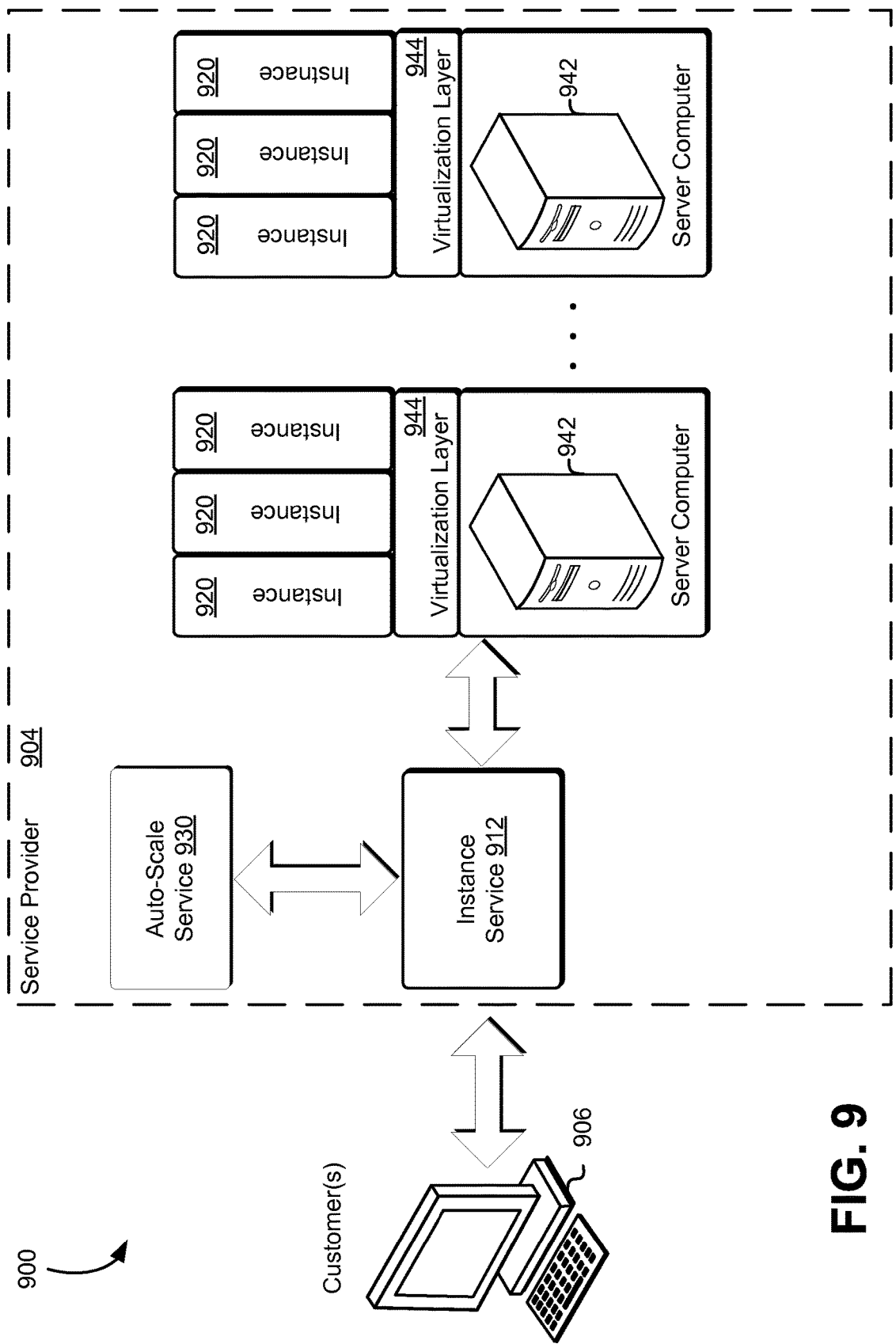
FIG. 9 illustrates an example of an instance service and auto-scaling service in accordance with an embodiment.

FIG. 9 illustrates an instance service 912 in accordance with at least one embodiment. The instance service 912, which may be system hardware 940, is used by a service provider 904 to provide computation resources for customers. The system hardware 940 may include server computer 942. The server computer 942 may be any device or equipment configured to execute instructions for performing data computation, manipulation, or storage tasks, such as a computer or a server. A server computer 942 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The system hardware 940 may also include storage devices, such as storage disks and tapes, networking equipment, and the like.

A virtualization layer 944 may include a bare metal hypervisor or a hosted hypervisor. The virtualization layer 944 executing on the service computer 942 enables the system hardware 940 to be used to provide computational resources upon which one or more computer instances 920 may operate. For example, the virtualization layer may enable a virtual machine 920 to access system hardware 940 on the server computer 942 through virtual device drivers on the virtual machine 920. The virtualization layer 944 may include a hypervisor or virtualization software and/or hardware. The virtualization layer may also include an instance of an operating system dedicated to administering the computer instances 920 running on the server computer 942. Each virtualization layer 944 may include its own networking software stack, responsible for communication with other virtualization layers 944 and, at least in some embodiments, also responsible for implementing network connectivity between the computer instances 920 running on the server computer 942 and other computer instances 920 running on other server computers 942. Furthermore, the server computer 942 may host multiple virtualization layers 944 of the same or different types on the same server computer 942. The virtualization layer 944 may be any device, software, or firmware used for providing a virtual computing platform for the computer instances 920. The virtual computing platform may include various virtual computer components, such as one or more virtual CPUs, virtual memory, and the like. The computer instances 920 may be provided to the customers of the service provider 904 and the customers may run an operating system or an application on the computer instances 920. Further, the service provider 904 may use one or more of its own computer instances 920 for executing its applications. At least a portion of the computer instances 920 may execute kernel-level components for one or more other computer instances 920. For example, a particular computer instance may execute a parent partition configured to manage one or more child partitions executed by other computer instances, where the particular computer instance and the other computer instances are supported by the same virtualization layer 944.

Commands and other information may be included in an API call from the virtual machine management service 912 or the auto-scaling service 230 to the virtualization layer 944. The virtual machine management service 912 may enable the customers 906 to manage and operate the computer instances 920. For example, the customer 906 may transmit a request to the virtual machine management service 912 to terminate all computer instances 920 operated by the customers 906. The request may be an API call including information corresponding to the customers 906 and computer instances 920. The virtual machine management service 912 may determine the corresponding virtualization layer 944 for the computer instances 920 included in the request and transmit a terminate command to the virtualization layer 944. The virtual machine management service 912 may be implemented in at least some embodiments, enabling a variety of client applications to run on virtual computer servers or computer instances 920 instantiated on behalf of the customers 906. The computer instances 920 may each comprise a virtual machine, with its own operating system comprising a networking software stack, and multiple such instances may be hosted on a given server computer 942 at a service provider network data center.

Figure 10:
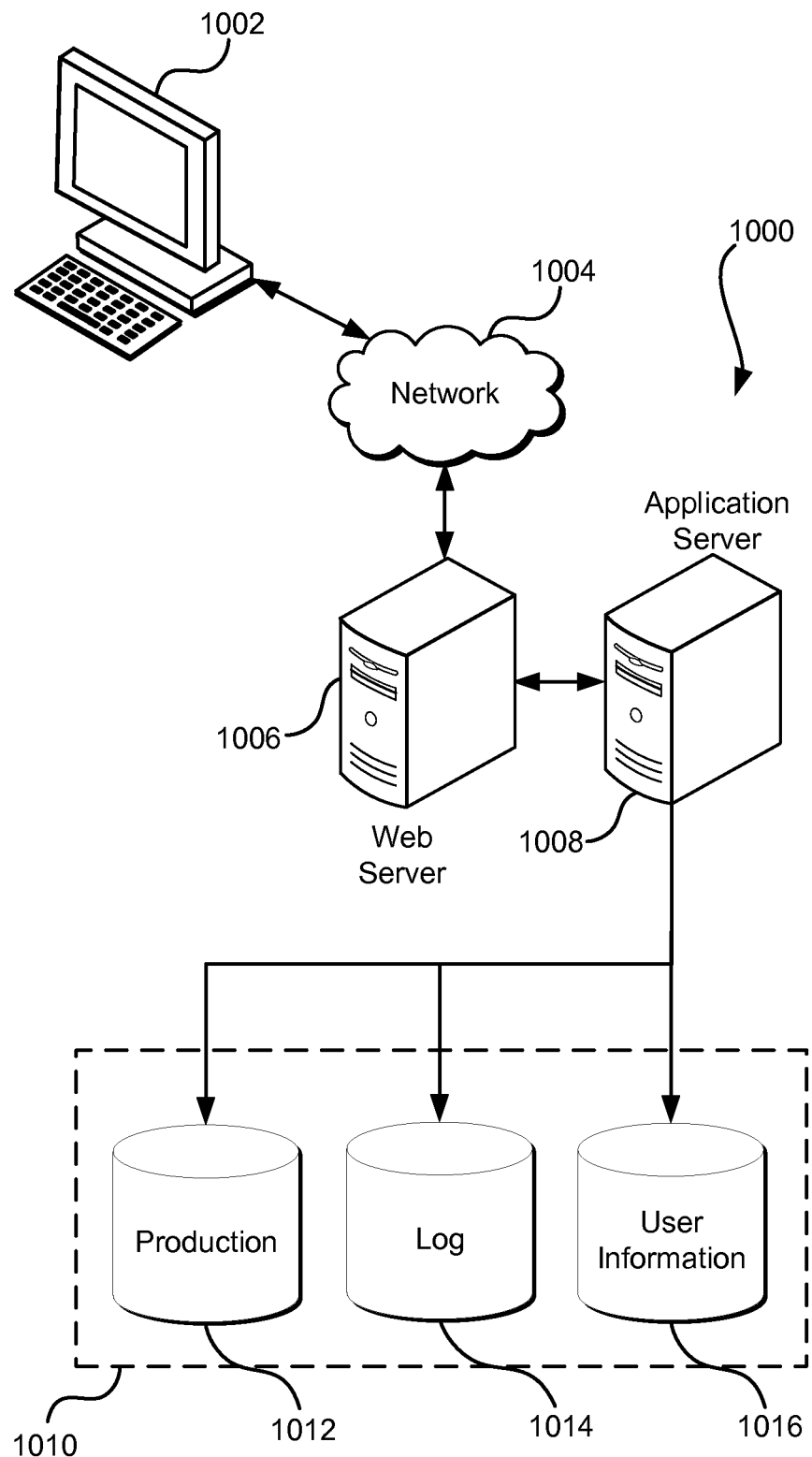
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle °, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving an application programming interface call to place a computer system instance of an auto-scaling group into standby, wherein a first set of computer system instances is assigned to the auto-scaling group;
   determining that fulfillment of the received application programming interface call complies with a setting of the auto-scaling group and that the computer system instance can be placed into standby;
   updating a capacity of the auto-scaling group;
   initiating a workflow to place the computer system instance into standby by at least:
     deregistering the computer system instance from a load balancer associated with the auto-scaling group, thereby preventing the load balancer from sending request processing traffic to the computer system instance; and
     removing the computer system instance from a second set of computer system instances for which utilization information specific to the auto-scaling group is obtained; and
   fulfilling the application programming interface call as a result of having placed the computer system instance in standby so that the computer system instance continues to run but does not contribute to the capacity of the auto-scaling group.

2. The computer-implemented method of claim 1, wherein the computer-implemented method further includes:
   receiving a request for information about the first set of computer system instances assigned to the auto-scaling group; and
   providing the requested information about the first set of computer system instances including information about the computer system instance in standby.

3. The computer-implemented method of claim 1, wherein the computer-implemented method further includes:
   receiving a request to interact with the computer system instance in standby; and
   fulfilling the request by an instance service separate from the auto-scaling group.

4. The computer-implemented method of claim 1, wherein the computer-implemented method further includes:
   receiving a second application programming interface call to place the standby computer system instance of the auto-scaling group into service for the auto-scaling group;
   determining that fulfillment of the received second application programming interface call complies with a setting of the auto-scaling group and the standby computer system instance can be placed into service for the auto-scaling group;
   updating the capacity of the auto-scaling group; and
   initiating a second workflow to place the standby computer system instance into service by at least:
     registering the standby computer system instance with the load balancer associated with the auto-scaling group; and
     adding the standby computer system instance to the second set of computer system instances for which utilization information specific to the auto-scaling group is obtained.

5. A system, comprising:
one or more processors; and
memory with instructions that, when executed by the one or more processors, cause the system to:
receive an application programming interface call to place an instance of an auto-scaling group into standby, wherein a set of instances is assigned to the auto-scaling group; and
respond to the application programming interface call by:
removing the instance from a load balancer configured to manage traffic for the auto-scaling group, thereby preventing the load balancer from sending request processing traffic to the computer system instance;
removing the instance from a metrics service configured to obtain utilization information for the auto-scaling group; and
updating a capacity of the auto-scaling group, wherein the instance continues to run after being placed into standby.

6. The system of claim 5, wherein the memory further includes instructions that, when executed by the one or more processors, cause the system to determine the auto-scaling group to which the instance is assigned based at least in part on the application programming interface call.

7. The system of claim 5, wherein the instructions that cause the system to update the capacity of the auto-scaling group further cause the system to instantiate a replacement instance for the instance to be placed into standby based at least in part on information included in the application programming interface call.

8. The system of claim 5, wherein the memory further includes instructions that, when executed by the one or more processors, cause the system to transmit a status update for the instances assigned to the auto-scaling group, wherein the status update includes information about the instance placed into standby.

9. The system of claim 5, wherein the memory further includes instructions that, when executed by the one or more processors, cause the system to execute a health check on one or more of the instances assigned to the auto-scaling group including the instance placed into standby.

10. The system of claim 5, wherein the memory further includes instructions that, when executed by the one or more processors, cause the system to, in response to a second application programming interface call to move the instance into service in the auto-scaling group, move the instance placed into standby into service in the auto-scaling group.

11. The system of claim 5, wherein application programming interface call includes information for identifying the instance, information for identifying the auto-scaling group, and information indicating to the auto-scaling group to decrement the capacity of the auto-scaling group.

12. The system of claim 5, wherein the memory further includes instructions that, when executed by the one or more processors, cause the system to provide, in response to receiving the application programming interface call, job information associated with the application programming call, the job information configured to enable status checks on a workflow initiated to fulfill the application programming interface call.

13. A non-transitory computer-readable storage medium having stored thereon executable instructions that, when executed by one or more processors of a computer system, cause the computer system to at least:
receive a request to move an instance of an auto-scaling group from in service to standby;
move the instance to standby such that the instance is still within the auto-scaling group but does not contribute to a capacity of the auto-scaling group, thereby preventing a load balancer from sending request processing traffic to the computer system instance; and
update the capacity of the auto-scaling group based at least in part on the instance being moved into standby.

14. The non-transitory computer-readable storage medium of claim 13, wherein the instructions that cause the computer system to move the instance to standby further cause the computer system to remove the instance from a set of instances for which utilization information specific to the auto-scaling group is obtained.

15. The non-transitory computer-readable storage medium of claim 13, wherein the instructions that cause the computer system to move the instance to standby further cause the computer system to deregister the instance from a load balancer associated with the auto-scaling group.

16. The non-transitory computer-readable storage medium of claim 13, wherein the instructions further comprise instructions that, when executed by the one or more processors, cause the computer system to determine that the instance is a member of the auto-scaling group.

17. The non-transitory computer-readable storage medium of claim 13, wherein the instructions further comprise instructions that, when executed by the one or more processors, cause the computer system to execute a health check of the instance after the request has been fulfilled.

18. The non-transitory computer-readable storage medium of claim 17, wherein the instructions further comprise instructions that, when executed by the one or more processors, cause the computer system to provide descriptive information for the instance, the descriptive information based at least in part on the health check executed on the instance after the request has been fulfilled.

19. The non-transitory computer-readable storage medium of claim 13, wherein the instructions further comprise instructions that, when executed by the one or more processors, cause the computer system to determine that the instance is not currently assigned a status of standby.

20. The non-transitory computer-readable storage medium of claim 13, wherein the instructions further comprise instructions that, when executed by the one or more processors, cause the computer system to instantiate at least one other instance to replace the instance being moved to standby based at least in part on a parameter included in the request.

* * * * *